United States Patent [19]
Ernst et al.

[11] 3,805,932
[45] Apr. 23, 1974

[54] UNIDIRECTIONAL BEARING

[75] Inventors: Horst Ernst, Eltingshausen; Rainer Schurger, Arnstein; Gunter Neder, Schweinfurt, all of Germany

[73] Assignee: SKF Industrial Trading and Development Company, Amsterdam, Netherlands

[22] Filed: Jan. 15, 1973

[21] Appl. No.: 323,649

[30] Foreign Application Priority Data
Jan. 20, 1972 Germany.............................. 2202550

[52] U.S. Cl. ................................................ 192/45
[51] Int. Cl............................................. F16d 15/00
[58] Field of Search........................... 192/45, 48.92

[56] References Cited
UNITED STATES PATENTS
3,426,874  2/1969  Johnston, Jr................ 192/48.92 X Primary Examiner—Allan D. Herrmann
Assistant Examiner—Frank H. McKenzie, Jr.
Attorney, Agent, or Firm—Murray Schaffer

[57] ABSTRACT

An antifriction bearing comprising an inner and outer ring between which a plurality of bearing elements are located. The elements are arranged in two parallel rows spaced from each other and a cage holding at least one row is interposed therebetween. The cage is provided with surfaces which engage the bearing elements and which clamp and stop the elements from rotating in one direction.

13 Claims, 11 Drawing Figures 3,805,932

UNIDIRECTIONAL BEARING

BACKGROUND OF THE INVENTION

The present invention relates to anti-friction bearings and in particular to a selectively operable unidirectional bearing which limits rotation in one direction.

Free running couplings are known which comprise an inner and an outer race ring having a single race groove in which are arranged a plurality of roller balls. The balls are held in a cage, having a clamping surface or ramp which stops the bearing by engaging one of the race rings in clamping contact. A disadvantage of this construction is that the cage is continuously biased and loaded in the single clamping position.

It is the object of the present invention to provide a roller bearing of the type described which improves over the prior art.

It is a further object of the present invention to provide a roller bearing having clamping means for obtaining unidirectional rotation.

It is still another object of the present invention to provide a roller bearing of the type described which is capable of carrying axial and radial loads.

It is yet another object of the present invention to provide a roller bearing of the type described which may be switched from free running to uni-directional braking at a high switching speed.

These and other objects, as well as numerous advantages will be obvious from the following disclosure of the preferred embodiments of the present invention.

SUMMARY OF INVENTION

Briefly, according to the present invention, a unidirectional bearing is provided comprising an inner and outer ring in which two rows of bearing elements are located. At least one row of the bearing elements are driven in a cage having pockets for receiving the bearings individually and which is provided with a surface or ramp edge acting as a clamping means when the bearing is rotated in one direction.

Preferably, at least one row of the bearings are set within a race groove formed in both race rings, which grooves provide surfaces inclined to the radial to accept radial and axial thrust loads.

Preferably, the cage and balls are arranged so that the point or line of clamping occurs on the roller bearing element which is offset from the center of axis of rotation of the roller element itself. The degree of force need and the speed of switching from running to brake position may be regulated by varying the degree of offset. The clamping surface or ramp on the cage acts on the bearing elements to brace the elements against the race surface to form triangularly opposed clamping forces on the ball directly.

The bearing elements may be balls, or rollers of any type or combinations thereof. Various arrangements of the bearing elements and cages can be made.

Full details of the present invention and of several preferred embodiments are set forth in the following description in which reference is made to the accompanying drawings.

DESCRIPTION OF INVENTION

Figure 1:
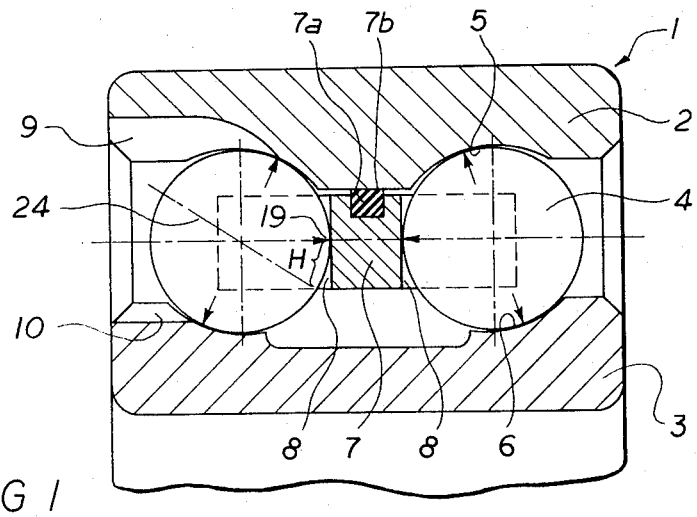
FIG. 1 is an axial cross section through a bearing constructed according to the present invention.

The present invention is illustrated in FIG. 1 as applied to a bearing comprising a double row of roller balls riding on inclined or slanted race surfaces. The bearing 1 comprises an outer ring 2 and a concentric inner ring 3 between which the balls 4 are located in two parallel rows to ride on the radially inclined race surfaces 5 and 6. Each row of balls lies in a plane perpendicular to the axis of bearing rotation. The balls are held in a cage 7 which has opposed clamping surfaces 8 which, in this instance are radial flanks, adapted to act on the balls in each row, along the directions shown by the arrows, to fix the balls in static position relative to the race surfaces 5 and 6.

The cage 7 is a ring-like member, the upper and lower surfaces of which lie in parallel circular planes. The clamping surfaces are inclined faces or ramps or other shaped edge portions adapted to wedge against the ball elements. The frontal faces of the outer and inner rings are provided with grooves 9 and 10 respectively which when aligned form a hole through which the balls 4 may be inserted or removed from between the rings. After insertion of the first row of balls 4 (to the right in FIG. 1) the cage 7 can be inserted by merely shoving it between the opposing interior surfaces of the rings before insertion of the second row of balls. If desired to further secure the cage an annular ring 7a can be placed in a receiving groove 7b formed in the upper surface of the cage so as to engage and act as a retaining wedge against the interior surface of the outer race ring. The retaining ring 7a can be made of a material having a high coefficient of friction.

As seen in FIG. 1, which is an axial section through the bearing, the point 19 at which the clamping surfaces 8 engage the balls 4 is substantially along a line parallel to the axis of bearing rotation (this is also within the circular path of revolution of the balls 4) while because of the inclined race surfaces 5 and 6 the axis of rotation 24 of the balls 4 is offset therefrom by a distance H. The points of engagement of the ball with the races 5 and 6 is also shown by suitable arrows.

Figure 2:
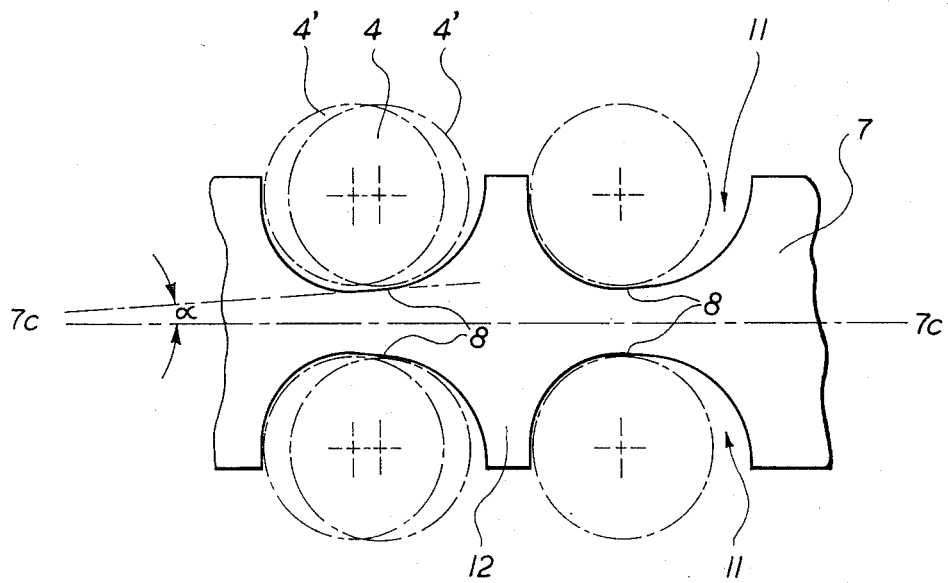
FIG. 2 is a planar development of the cage of the bearing as shown in FIG. 1.

The development of the cage 7 is seen in FIG. 2 in plan view. It is formed with a series of curved pockets 11 uniformly spaced along each of its axial edges separated by a web portion 12. Each of the pockets 11 have circular curved sides against which the balls 4 are adapted to rotate and generally flattened bottom surfaces forming the clamping surfaces 8. The flattened clamping surfaces are offset from the transverse axis 7c of the cage by an angle α so that in addition to its flatness it is also inclined in respect to the axial direction of bearing. The play and freedom of movement of the balls in the pockets between the web portions 12 and the angle α of the clamping surface 8 defines the speed at which the balls are stopped when the cage is moved in the clamping direction and therefore may be varied as desired.

In the form shown in FIG. 2 the pockets along each side are arranged oppositely to each other in transversely aligned pairs. The position at which the balls run freely is shown as 4' while the clamping position is shown as 4''. Clamping or braking action occurs automatically of course when it is attempted to run the bearing backwards or in the direction contrary to the designed free running direction.

Figure 3:
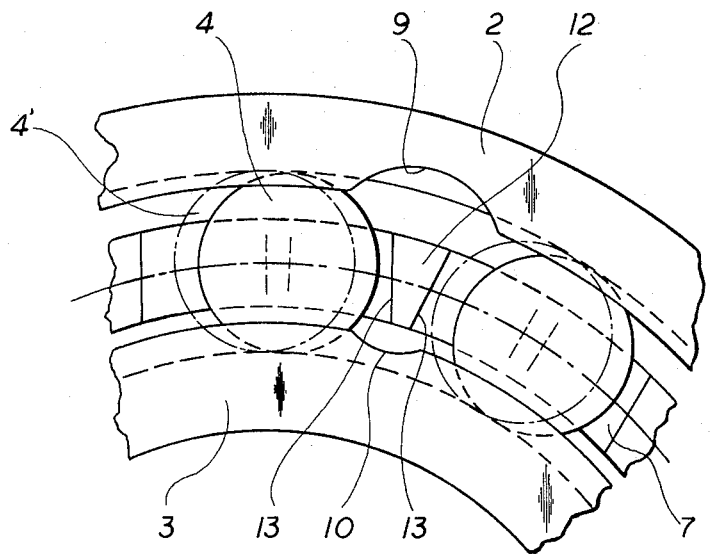
FIG. 3 is a side view of the bearing according to FIG. 1 showing a slightly modified cage.

In FIG. 3 the web portion 12 of the cage 7 of FIG. 1 is seen in a slight modification which may be used if desired. Here the radially disposed side walls or flanks 13 of each web portion are themselves inclined from the radial direction of the bearing. This also aids in the clamping action. However, these surfaces may be slightly curved or contoured to match the ball.

Figure 4:
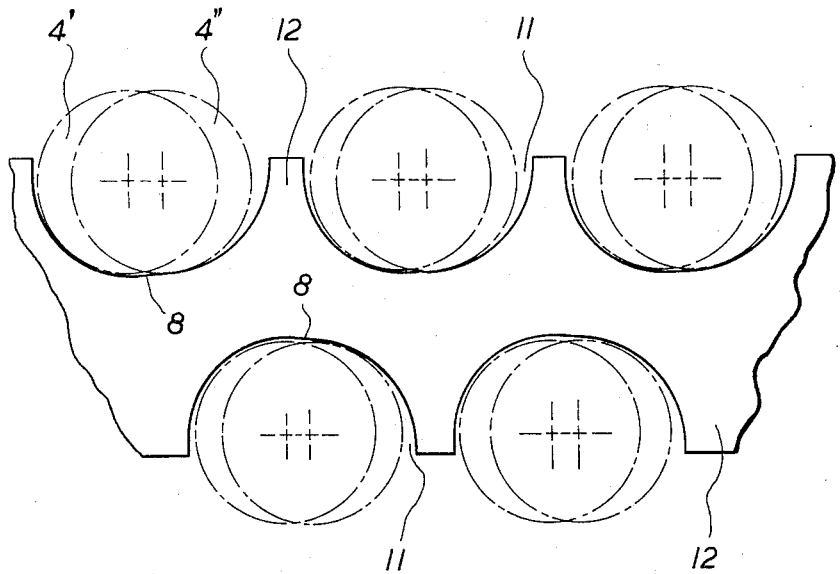
FIGS. 4 and 5 show still other modified forms of the cage.

In FIG. 4, an embodiment is shown wherein the cage 7, which is otherwise the same as that shown in FIG. 1 – 3, has the pockets 11 and webs 12 along one side staggered with respect to those on the other side.

To increase the speed at which the balls 4 may be switched into the clamping position, in either of the cages of FIGS. 2, 3, or 4, spring means may be used to normally bias the balls into the clamping position 4', which bias is overcome by the normal rotation of the balls.

Figure 5:
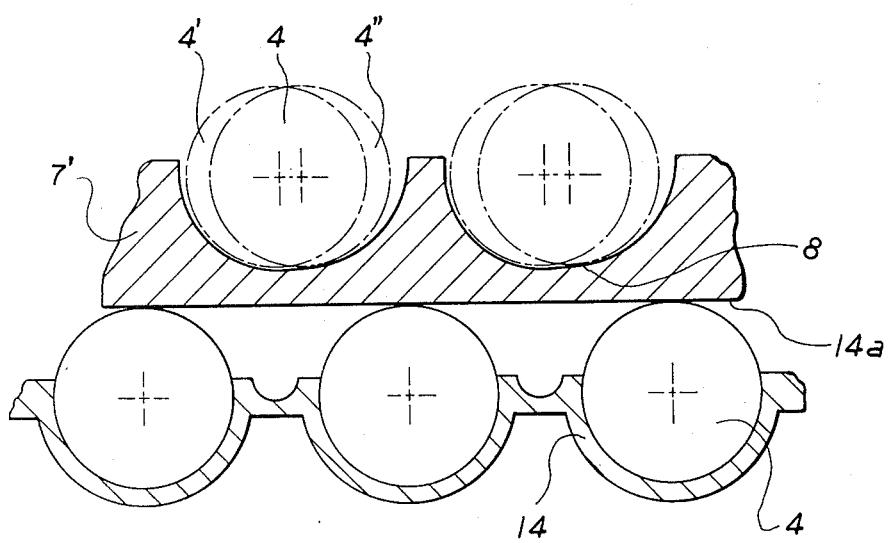

In FIG. 5 a modified version of the bearing is seen in a sectional view similar to that of FIG. 2. In this version, however, the bearing is provided with a cage 7' which has only one series of pockets 11 along only one of its axial edges. This cage 7' holds only one row of balls 4. The other row of balls 4 are freely held, in a more conventional cage 14, having spherical pockets for the balls, not provided with clamping surfaces 8. Preferably, the conventional cage may be of the snap type which hold the balls securely but permit free rotation. The cage 7' has a smooth uniform annular surface 14a which forms the race surface against which the balls in the cage 14 can roll.

Figure 6:
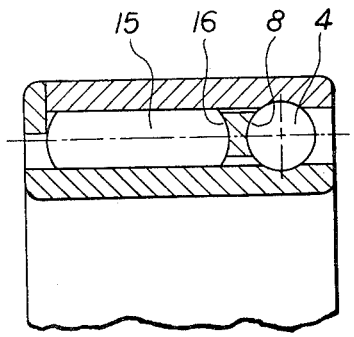
FIGS. 6 and 7 are further examples of bearings according to the invention wherein at least one of the rows of elements are formed of roller bearings.
Figure 7:
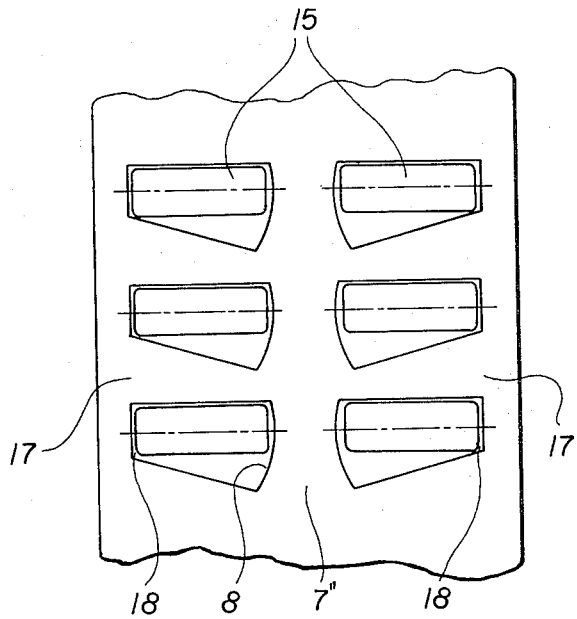

A further embodiment of the present invention is shown in FIGS. 6 and 7 wherein elongated rollers are used in combination with balls or alone. The bearing here is similar to that of FIG. 1 comprising an outer and inner race ring between which two rows of bearing elements are retained by a cage. The outer ring is cut down at its axial shoulder and provided with a removable retaining ring so that the bearing element and cage may be easily inserted. In FIG. 6, one row of balls is replaced by a row of roller bearing elements 15 such as cylindrical, conical, barrel or needle rollers having an elongated axis of rotation. The race surfaces for rollers 15 are smooth and flat being parallel to the axis of bearing rotation. The balls 4 ride in race surfaces which are not inclined to the radial but are disposed perpendicular to the axis of bearing rotation. The cage for use in the device of FIG. 6 may be similar to that shown in FIGS. 2 – 4 with the pockets enlarged to receive the rollers 15, or it may be formed similar to that seen in FIG. 1. Preferably, however, the clamping surface 8 engaging the balls 4 and the end 16 of the rollers should be concave. The end 16 of the rollers 15 should be convex. In this manner line contact can be made with the clamping surfaces 8.

FIG. 7 shows a plan view similar to that of FIG. 2 showing a cage 7'' adapted to receive one or two rows of rollers 15 in transverse pairs. The cage 7'' is formed as a single annular sheet having a continuous web 17 in which enclosed pockets 18 are formed. The pockets 18 appear in plan view as fan-shaped or conical sections. The enlarged arcuate edge of one row is made to face those of the other row. Preferably as seen the side of the fan-like pocket in the direction of normal rotation is parallel to axis of rotation while in the clamping direction the opposite edge is the one that fans outwardly, so that when the bearing is placed in clamping direction the rollers pivot in the plane of the cage about their outward ends and turn askew in clamping position.

It will be obvious, even from the so far limited description, that various and further embodiments are possible. For example, one or both rows of bearing elements can be arranged to carry the bearing load as well as being movable into clamping position. Particularly, the cage may be so broadly or widely formed in the axial direction so that one row of bearing elements serves only to absorb radial load and is not clampable.

Figure 8:
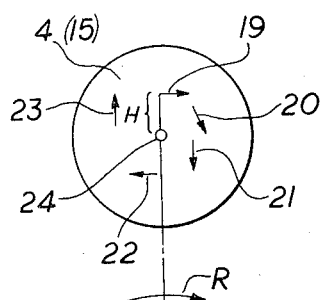
FIG. 8 is a schematic showing of a bearing element on which the various force vectors are shown.

In FIG. 8 an antifriction bearing element (4 or 15) is shown in side view, to schematically illustrate the directional vectors which are indicated by arrows 19 to 23 superimposed thereon. While the speed at which the bearing element normally moves is a combination of the revolution of the bearing element about the rotational axis indicated by the arrow R of the bearing and the rotation of bearing about its own center 24, the superimposition of these vectors need not be considered in this matter, since the clamping action between the clamping surface of the cage and the bearing element is related only to the rotation of the bearing element about its own central point.

If the rotating center of the bearing element is clamped by the clamping surface 8, then very little braking action is effected between the bearing rings themselves. When the bearing elements are only braced or clamped axially, then this bracing causes the bearing to act as "pivot bearing" allowing the bearing elements to rotate about their own axes without preventing the rings from rotating. In accordance with the present invention, the point of application of any one of the speed and force vectors 19 to 23 are offset from the center of rotation 24 by the distance H. When these points coincide with the clamping point or lie on the clamping line, then highly satisfactory clamping condition occurs in which braking is assured. The center of rotation 24 may, of course, be a point on a line axis, in which instance the points on the line spaced from this point create the braking action under the clamping effect.

Figure 9:
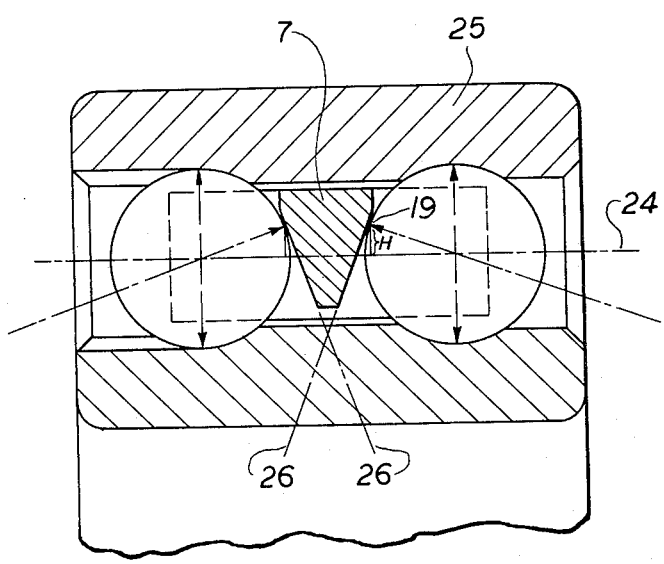
FIG. 9 is a view similar to FIG. 1 showing a double row of inclined ball bearing and a modified cage.

FIG. 9 shows a modification in which the device of FIG. 1 is changed so that the balls 4 of each row ride in race grooves which act perpendicularly to the axis of bearing rotation (i.e., radially rather than inclined thereto). The cage on the other hand is provided with clamping faces or flanks 26 which are inclined in opposite directions with respect to the radial, so that they cross one another in extension. The axis of rotation of the balls coincides with the path of revolution indicated by the line 24. The clamping point 19, however, is offset from this axis by the distance H, conversely to that shown in FIG. 1.

Figure 11:
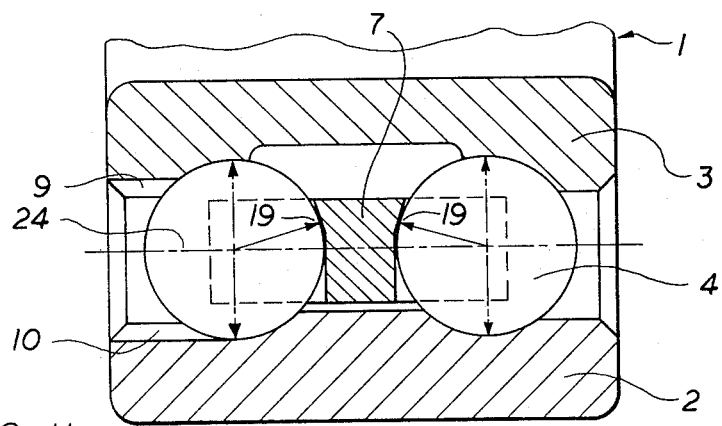
FIGS. 10 and 11 are a bearing in which the cage is excentrically positioned.
Figure 10:
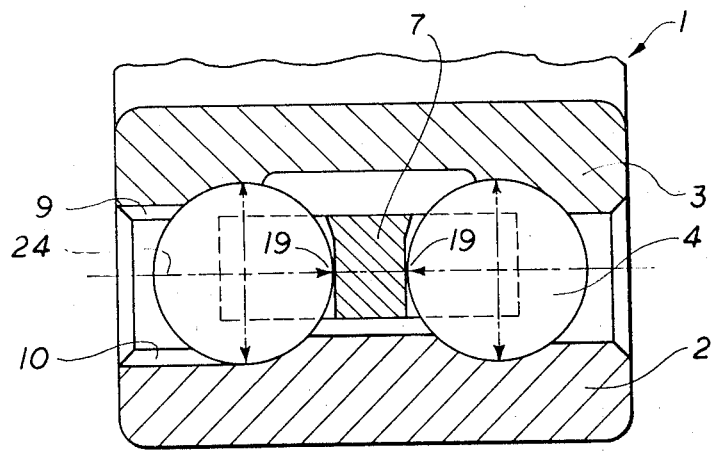

In FIGS. 10 and 11 still another variant is depicted. Here the figures show the portion of bearing in section below the axis of bearing rotation and indicate the possibility of providing the cage 7 concentric or eccentric of this axis, as desired. The race surfaces of the rings 2 and 3 are modified surfaces being in the outer ring normally grooved while in the inner ring slightly inclined. The clamping surfaces of the cage 7 are slightly tapered to have a wider portion at its interior face. In the concentric position seen in FIG. 10 the cage 7 is held so that the clamping point 19 coincides with the axis of rotation 24 at the more narrow part of the web of cage 7, while in the eccentric position seen in FIG. 11 the cage is dropped so as to be pulled by gravity so that the clamping point 19 is at the wider portion and is offset from the axis of rotation by the distance H.

It will be seen from the foregoing that a very advantageous and desirable anti-friction bearing is obtained which is capable of being prevented from rotation in one or the other direction so as to provide a unidirectional clutch bearing. Basically, the bearing is simply formed comprising an inner and outer ring in which two rows of bearing elements, of suitable shape are located. At least one of the rows of elements are located in grooved race surfaces which may be inclined to the radial if desired. The bearing elements are driven in a cage having pockets, which pockets are provided with edges or surfaces capable of acting as clamping instruments to prevent rotation of the ball. Thus the bearing may be assembled compactly and without complexity.

Since in accordance with the present invention clamping of the bearing element occurs at a point positioned offset from the axis or center rotation of the bearing element itself, the direction and degree of the speed and force vector at this point of rotation relative speed and force vector at the clamping point on the clamping surface causes the bearing element to be drawn into the clamping position more or less strongly and/or quickly. The distance of the clamping point relative to the axis of rotation defines the stopping or braking force of the bearing element and therefore the switching velocity from running to stopped condition. This distance may be varied by several means including the construction shown herein.

Preferably the bearing comprises a double row of balls in inclined races. In this manner the balls can be braced against the inner ring, the outer ring and the clamping surface in a three-directional or triangular brace as seen by the arrows in FIG. 1. Such a triangular array is very stable and produces a very static brake.

By replacing one row of balls with elongated rollers as shown in FIG. 5, a bearing having greater radial load capacity can be formed.

By matching the clamping surface to the convex shape of the roller a very good support for the bearing elements can be obtained as well as good clamping action. By making the clamping surface concave a linear clamping direction is developed between it and the bearing elements, which even with balls is advantageous since the facial pressures between the bearing elements and clamping surfaces is lessened.

The cage which holds the bearing elements and which forms the clamping surface can be formed in any conventional and desirable manner to effect the clamping action. The embodiment wherein a second or intermediate cage ring 7a is used is advantageous, since by forming this ring of metal or similar material having a high coefficient of friction, the cage can be actuated or at least assisted in its actuation by the movement of one or both of the race rings. On the other hand, the cage and the interior surfaces of one or both of the race rings can be so cooperatively formed that they engage or rub against each other to provide the relative interaction.

By arranging the pockets as desired in selected transverse aligned or in staggered position, advantages are also obtained. Twisting or turning torques on the cage can be obviated or prevented and the switching or clamping speed can be increased or regulated as desired. When only small clamping forces are desired, not all the pockets need have clamped surfaces. Further bearing elements which are clamped may have a different cross section from those which act only to carry the load.

The bearing may be otherwise made by conventional methods as a unitary package, and may be packed with suitable lubricant.

The embodiment wherein the cage may be made eccentric, has particular advantage when used in application under low rotary speed or standstill operation of the shaft. The eccentric play of the cage between the inner and outer ring allows the clamping surface to be vertually automatically varied in dependence upon the centrifugal action of the bearing elements.

Various modifications and embodiments will of course be evident to those skilled in this art. Accordingly, the foregoing disclosure is to be taken as illustrative only, and not limiting of the scope of the present invention.

What is claimed:

1. A bearing comprising inner and outer rings between which a plurality of antifriction bearing elements are located, said bearing elements being arranged in two annular rows axially spaced from each other, a cage arranged between said rows having means for holding the bearing elements in at least one row and clamping surfaces adapted to engage said bearing element to stop rotation of said bearing elements in one direction.

2. The bearing according to claim 1 wherein the point of contact between the bearing element and the clamping surface is offset in axial cross section from the axis of rotation of the bearing element itself.

3. The bearing according to claim 1 wherein the bearing elements are balls and the rings are formed with inclined race grooves for each of the rows of balls.

4. The bearing according to claim 3 wherein the cage causes the ball to be engaged in a triangular point array, one point being on the clamping surface, one point on the race of the outer ring and one point being on the race of the inner ring.

5. The bearing according to claim 1 wherein the bearing elements are elongated rollers such as cylindrical or barrel rollers.

6. The bearing according to claim 5 wherein the clamping surface opposite to the end of the roller bearing element is convex.

7. The bearing according to claim 6 wherein the clamping surface in axial cross section is concave.

8. The bearing according to claim 1 including an annular ring interposed between the cage and one of said rings.

9. The bearing according to claim 8 wherein the interposed ring is made of a material having a high coefficient of friction.

10. The bearing according to claim 1 wherein the cage is formed with pockets along each of its axial edges in which the bearing elements of each row are received, each pocket having a clamping surface.

11. The bearing according to claim 10 wherein the bearing elements in one row are axially aligned with the bearing elements in the other row.

12. The bearing according to claim 10 wherein the bearing elements of one row are radially staggered with respect to those of the other row.

13. The bearing according to claim 1 wherein the outer diameter of the cage is less than the inner diameter of the outer ring to provide a radial play therebetween whereby the cage may assume an eccentric position between the inner and outer ring.

* * * * *